United States Patent [19]

Kuts

[11] E Re. 29,268

[45] Reissued June 21, 1977

[54] FABRIC CUTTING

[75] Inventor: Mathew Kuts, Akron, Ohio

[73] Assignee: The B. F. Goodrich Company, Akron, Ohio

[22] Filed: Aug. 26, 1976

[21] Appl. No.: 717,932

Related U.S. Patent Documents

Reissue of:

[64] Patent No.: 3,924,503
Issued: Dec. 9, 1975
Appl. No.: 576,325
Filed: May 12, 1975

[52] U.S. Cl. ..... 83/488; 83/508; 83/562; 83/564; 83/676

[51] Int. Cl.[2] ..... B23D 19/02; B26D 1/20

[58] Field of Search ..... 83/486, 488, 508, 471.3, 83/675, 676, 562, 564, 694

[56] References Cited

UNITED STATES PATENTS 3,762,259 10/1973 Kuts ..... 83/488 X
3,848,501 11/1974 Kuts ..... 83/488 X

FOREIGN PATENTS OR APPLICATIONS 948,151 1/1964 United Kingdom ..... 83/488

*Primary Examiner*—Willie G. Abercrombie
*Attorney, Agent, or Firm*—Joseph Januszkiewicz; W. A. Shira, Jr.

[57] ABSTRACT

Bias cutting of rubberized fabric material wherein a carriage is reciprocated on a support frame, which frame may be adjusted angularly to determine the bias angle of cut. A cutter support is mounted on the carriage for movement therewith. Such cutter support journals for rotation a shaft that supports on one end a rotating cutter with a plurality of circumferentially spaced linear cutting edges that cooperate with an anvil carried by the cutter support to shear the fabric material. A guide is located adjacent to the anvil over which the fabric material is to travel and under which the conveyor belt moves. Upon completion of the cut, the cutter, anvil and its supporting framework is pivoted out of the way to permit the indexing of the material and the return of the cutter and anvil during such indexing to the starting position in preparation for the succeeding cutting operation.

9 Claims, 6 Drawing Figures

Fig. 1
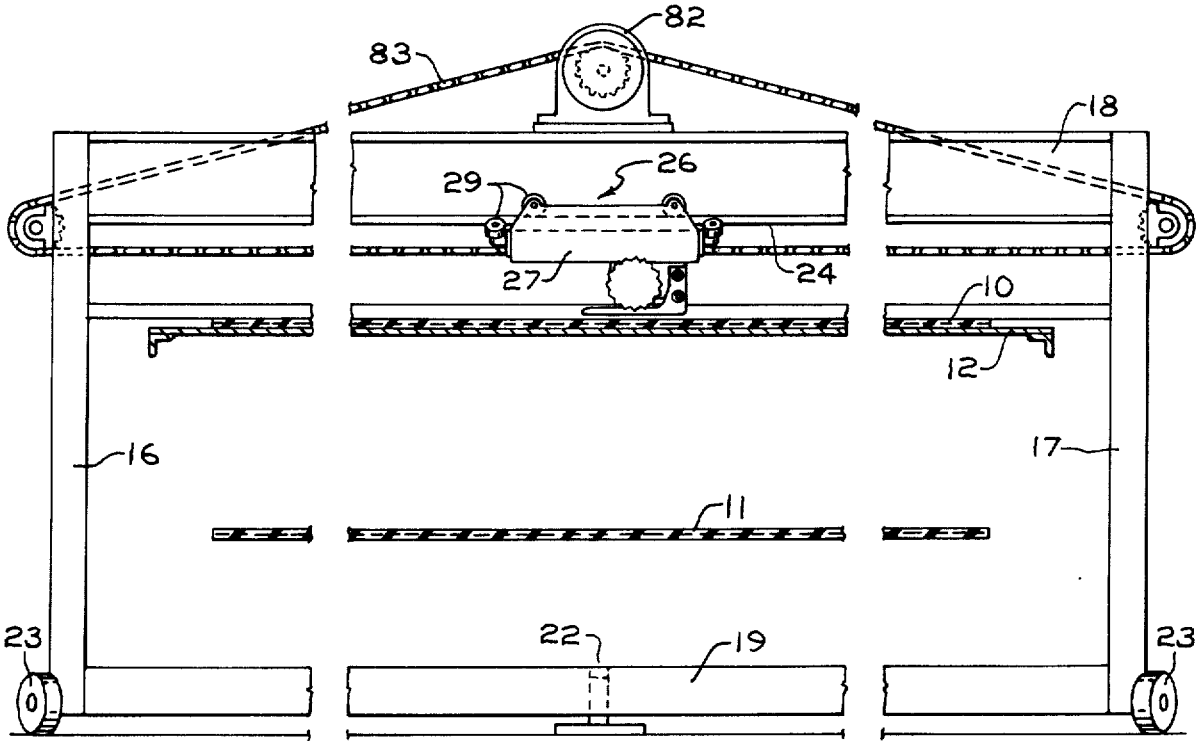
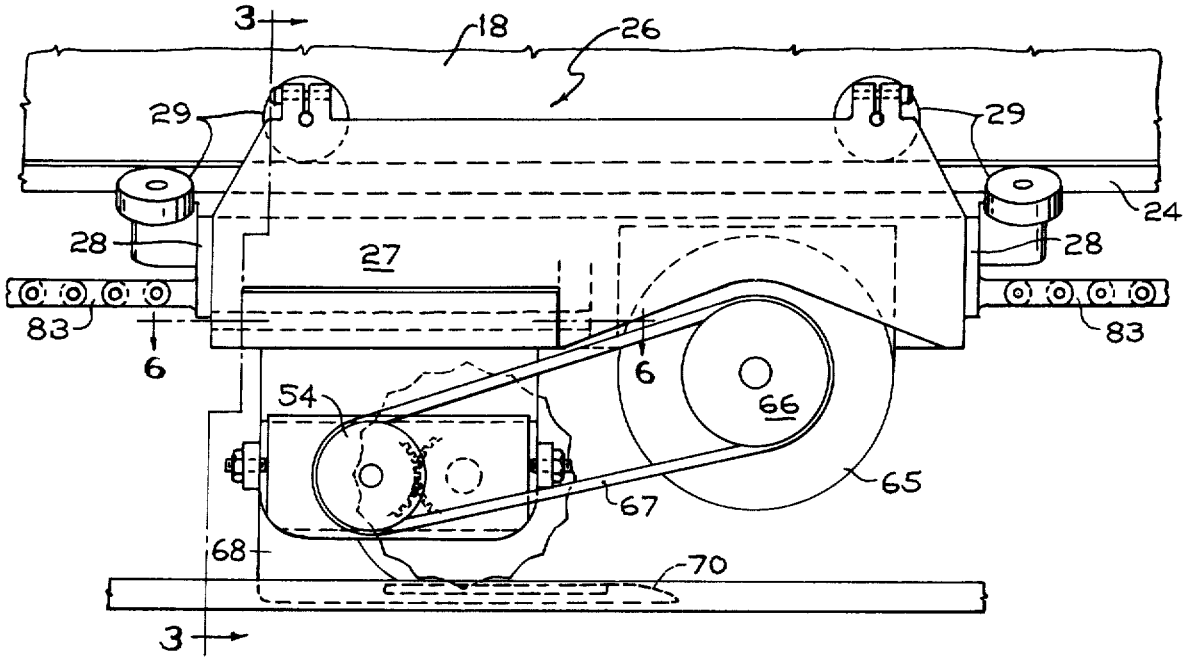
Fig. 2

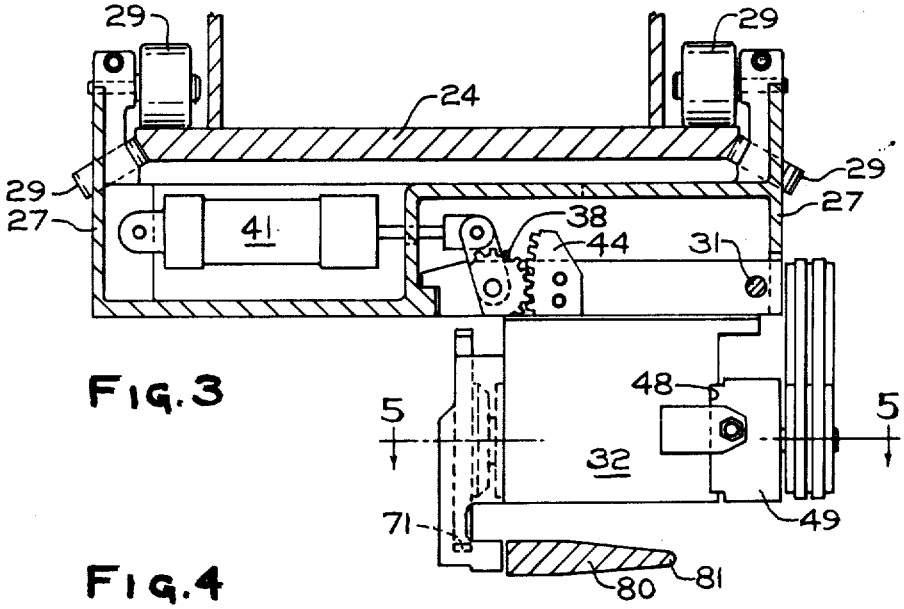
FIG. 3
FIG. 4
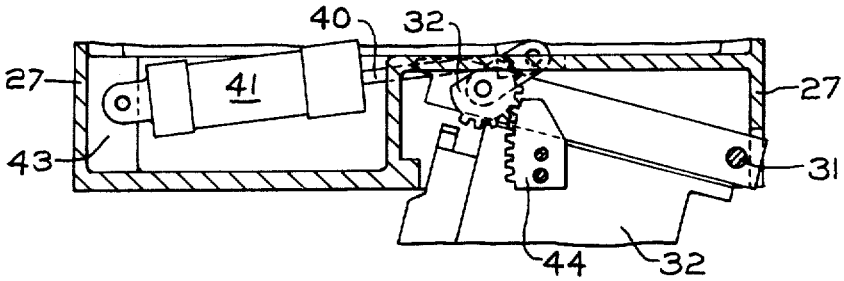
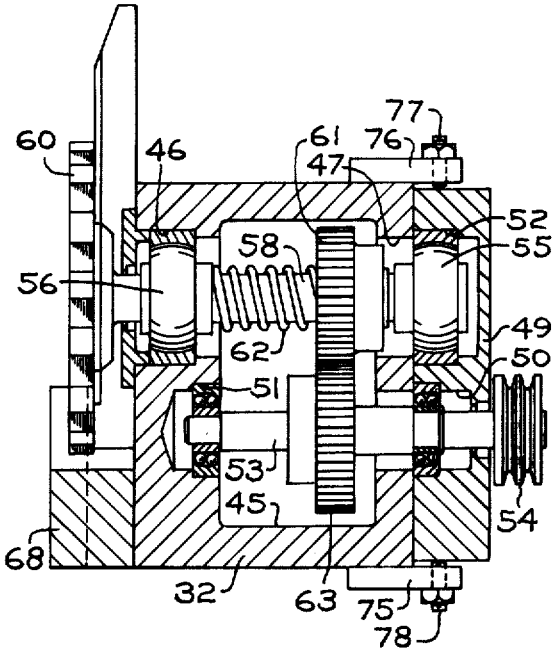
FIG. 5
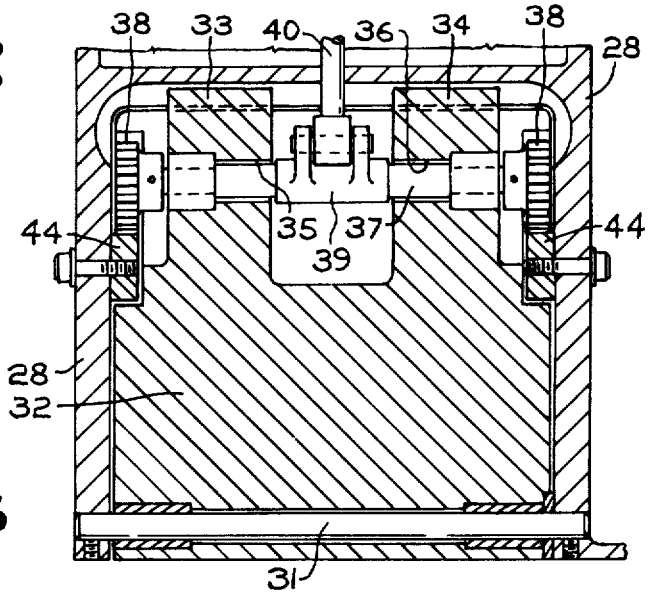
FIG. 6

FABRIC CUTTING

Matter enclosed in heavy brackets [ ] appears in the original patent but forms no part of this reissue specification; matter printed in italics indicates the additions made by reissue.

BACKGROUND OF THE INVENTION

This invention relates to pneumatic tire manufacture and more particularly to a cutting apparatus for cutting ply stock material which is employed in the construction and manufacture of pneumatic tires.

In the manufacture of pneumatic tires, one of the principal members used to build the tire carcass is a thin sheet of uncured rubber-like material known as a fabric, building ply or ply stock. In the manufacture of such ply stock, parallel cords of fabric are passed through a pair of rolls in cooperation with calendering rolls which work and calendar unvulcanized rubber onto the parallel cords as they pass through the pinch rolls to form a continuous sheet with the parallel strands of cord fabric embedded therein and running in direction that is parallel to the longitudinal centerline of the materials. Thereafter, such sheet material is bias cut into sections of fabric which are then spliced together to make a building ply or ply stock with cords therein located at a desired bias angle relative to the longitudinal centerline of the ply stock. Such stock or ply stock may be at 90° angle to the longitudinal centerline of the ply stock formed; however, for purpose of this description and example, the invention will be described wherein the cords are at some small acute angle relative to the longitudinal centerline of the ply stock. Layers of ply stock are applied to a tire building drum in such a manner that cord members of overlapping plies criss-cross with respect to the cord members above or below. The tire beads are then set against the ends of the ply stock and the plies are turned thereover. Additional plies, chafer strips, sidewall strip, breakers, overhead belts and a tread ply may be applied in varying orders, and stitched thereto. Such carcass is substantially a flat band, wherein the angle is measured between the cords and the circumferential line around the crown of the tire. In the case of conventional bias ply pneumatic passenger tires, this may be approximately 60°. However, this apparatus can cut fabric material with wire strands therein which run normal to the direction of conveyance. After the removal of such green tire, the tire is given a toroidal shape during vulcanization or on a second machine prior to vulcanization, wherein the angle after vulcanization may be 30° to 35° in the above example depending on many factors including drum set. The above description has generally referred to tires manufactured from fabric, however, the present invention is also directed to building plies which use non-extensible cord materials such as nylon, kevlar and wire. In the processing of ply stock containing wire, processing has been difficult because of the inherent difficulty in cutting wire, which cutting is particularly compounded by the very low bias angle cutting on such stock wherein the cutters tend to push and displace the wire ends, which action distorts the stock. This apparatus can also cut stock which has zero bias angle.

In bias cutting rubberized cloth fabric, the conventional way of cutting is to use a pair of fingers that lift the fabric away from the conveyor belt on which it travels, so that a rapidly rotating cutter disk above the fingers but cooperative therewith cuts the fabric. The application of this apparatus to rubberized wire fabric including fabric for radial tires is difficult and unsatisfactory. Where the speed of rotation of the rotating cutter is greater than the linear speed of the cutter as it moves across the material to be cut, the tendency is to gather the material due to the action of the rapidly rotating cutter; whereas if the rotational speed is less than the linear speed, the tendency is to push the fabric material ahead of the cutter. The rotating cutter of the present invention has a plurality of circumferentially spaced cutting edges which are linear, giving the cutter a downwardly cutting or shearing action in cooperation with a linearly movable anvil that is supported in its movement to assure a firm cutting action during the shearing cut. Upon the completion of a cut across the fabric material, it is desirable to move the cutter and anvil out of the way so that as the cutter and anvil can be returned to their starting position while the fabric material can be advanced or indexed to the next position in preparation for the succeeding cut.

SUMMARY OF THE INVENTION

The present invention contemplates an apparatus that utilizes a carriage which is mounted on a support frame for reciprocal movement on a guideway. The support frame may be adjusted for the bias angle to be cut, or it may be adjusted for zero bias angle. A cutter support member carrying a cutter and its cooperative anvil is mounted on the carriage for movement therewith. The anvil is supported by the cutter housing in its reciprocal movement. Means are provided to pivot the cutter and the cutter support member along with the anvil out of the way so that as the cutter and anvil can be returned to the original starting position while the fabric material to be cut is indexed in preparation for the next cut. The rotating cutter has a plurality of circumferentially spaced cutting edges, which edges are linear and parallel to the cooperative cutting edge of the anvil giving the cutter a downward shearing action in cooperation with the traveling anvil, which anvil is supported by the cutter support.

BRIEF DESCRIPTION OF THE DRAWINGS

FIG. 1 is a front elevational view of a bias cutting apparatus with a portion of the conveyor shown.

FIG. 2 is an enlarged front elevational view of the carriage, cutter support, anvil and a portion of the guide bar.

FIG. 3 is a cross-sectional view of the carriage and cutting means taken along lines 3—3 of FIG. 2.

FIG. 4 is a fragmentary cross-sectional view of the carriage and cutter support showing the cutting support elevated taken along lines 5—5 of FIG. 3.

FIG. 5 is a cross-sectional plan view of the cutter support means.

FIG. 6 is a cross-sectional plan view of the carriage and center support taken along lines 6—6 of FIG. 2.

DETAILED DESCRIPTION

Referring to the drawings wherein like reference characters designate like or corresponding parts throughout the several views, there is shown in FIG. 1 an endless conveyor belt that is suitably supported at spaced ends thereof by suitable rollers driven in the manner old and well-known in the art. The conveyor belt has an upper conveyor run 10 and a lower return run 11. Suitable guide and support means are provided to guide the belt in its travel, including an upper plate 12 to support upper run 10. Supporting framework shown generally in FIG. 1 includes a pair of spaced upwardly extending support members 16 and 17 with suitable supports including an upper cross support or I-beam 18 and a lower cross support 19. Lower support 19 has a pivot mounting 22 at its intermediate lower portion suitably journaled in the floor of the installation, about which the support framework can be pivotally adjusted. A plurality of spaced rollers 23 are suitably mounted on respective lower end portions of the supporting framework to facilitate the angular adjustment of the supporting frame and the bias cutting apparatus to be described. Cross support 18 extends across the entire width of the bias cutting apparatus and as shown in FIG. 3 supports a guideway or guideway member 24 having a plurality of ways thereon. Mounted for reciprocal movement on guideway 24 is a carriage means 26 which includes side plates 27—27 and end plates 28—28. Suitably journaled on carriage means 26 are a plurality of rollers 29 which rollingly engage the ways on guideway 24 to maintain carriage means 26 thereon and guide the reciprocal movement of the carriage means 26 on the ways of the guideway 24. Journaled on the lower one end portion of end plates 28—28 of carriage means 26 is a rod or shaft 31 for pivotally supporting a cutter support member 32. Cutter support member 32 has a pair of bosses 33 and 34 integral therewith each having aligned stepped bores 35–36 in which is journaled a shaft 37. Shaft 37 has spur gears 38—38 suitably keyed to the respective end portion thereof. Shaft 37 has sleeve 39 secured thereto which sleeve 39 has a clevis for pivotal attachment to the rod end of piston rod 40 of a pneumatic cylinder 41. The head end of pneumatic cylinder 41 is pivotally attached to a bracket means 43 which is part of the side plate 27 of carriage means 26. The respective spur gears 38—38 meshingly engage stationary gear segments 44 that are rigidly secured to the respective end plates 28—28 of carriage means 26. Upon actuation of the head of cylinder 41, piston rod 40 is extended from the position shown in FIG. 3 to that shown in FIG. 4 whereby the spur gears 38 rotate clockwise as shown in FIG. 3 pivoting the cutter support member 32 in a clockwise direction (as viewed in FIG. 3) about shaft 31 for a purpose to be described.

The lower portion of cutter support member 32 is centrally recessed as at 45 with a pair of bores 46–47 on the respective side thereof. The one face of cutter support member 32 is recessed at 48 to provide guideways which support an adjustable block 49. Block 49 has a first bore 50 in alignment with a bore 51 in cutter support member 32 and a second bore 52 in alignment with bores 46 and 47 in cutter support member 32. Bores 50 and 51 journal self-aligning bearings which support a shaft 53 having a sheave 54 keyed to one end thereof. Mounted in bores 46 and 52 are self-aligning bearings 55–56 respectively, journaling for rotation a shaft 58, which shaft 58 has a cutter 60 secured thereto for rotation therewith. A spur gear 61 keyed to shaft 58 is biased in a rightward direction by spring 62 (as viewed in FIG. 5). Spur gear 61 meshes with spur gear 63 keyed to shaft [52] *53* and is driven thereby. A motor 65 suitably secured to carriage means 26 has its output shaft connected to a sheave 66 which is in alignment with sheave 54. A V-belt 67 is trained about sheaves 66 and 54, to provide the transfer of power from motor 65 to cutter 60. Suitably secured to cutter support member 32 is an L-shaped bracket member 68 with its lower end portion having a laterally horizontally extending anvil 70 that is suitably recessed to receive an insert 71 which may be made of carbide.

Cutter support member 32 has a pair of brackets 75–76 suitably secured thereto, which brackets 75–76 have aligned bores therein threadedly engaged by set screws 77–78. The respective end portions of set screws 77–78 abuttingly engage the block 49 to adjust its lateral position on the guideways 48 in the cutter support member 32. Such block 49 carries the self-aligning bearing 55 to permit the adjustment of block 49 by set screws 77–78 to assure that the cutting edge of cutter 60 is parallel to the cutting edge of anvil 70 to provide an unusual and excellent shearing action. The anvil 70 is moved parallel to the edge of guide bar 80, which bar 80 has a leading edge 81 which facilitates the movement of the fabric material thereover while the upper conveying run 10 moves under the bar 80.

The intermediate upper portion of I-beam 18, as shown in FIG. 1, supports a variable speed motor 82 having its output connected to a sprocket chain 83 which in turn is connected to carriage 26 and controls the reciprocation of the carriage on the guideway member 24 by suitable controls and limit switches old and well-known in the art.

In the operation of the apparatus described as is well-known in the art, the fabric material is advanced over the guide bar 80 by the upper conveying run 10 and, after sufficient material has advanced, the conveyor belt, motor 82 is energized which thereby moves carriage 26 across guide bar 80 while cutter 60 is rotated at a high speed through the output of motor 65 which transfers its output to the V-belt 67 and thence to shaft 58. The cutting edge of cutter 60 is parallel to the cutting edge of anvil 70. The cutting edge of cutter 60 performs a snipping action which is a downward movement of the linear cutting edge across the fabric such that with the wire cords embedded in the fabric are cut efficiently without displacing the wire strands or cord of the linear cutting edge in cooperation with anvil 70. Such action is similar to that of tin snips moving across a wire fabric. Upon completion of the cut, motor 82 is deenergized and the head end of cylinder 41 is pressurized, which action rotates the shaft 37 and spur gears 38 which mesh with stationary gear segments 44. Such action causes the gears 38 to roll up the gear segment 44, pivoting the cutter support 32, along with the cutter 60 and anvil 70 cut away from the guide bar 80 about shaft 31 to permit the advancement of the fabric material as the carriage 26 is returned to its initial starting position by motor 82 through suitable limit switches and controls old and well-known in the art. Upon return of the carriage to its initial starting position, the rod end of cylinder 41 is pressurized and returns the cutter support member 32 and anvil 70 to the lowered position such that anvil 70 is in engagement, a position relative to the cutter 60 and the guide bar 80 for the next succeeding cut.

Various modifications are contemplated and may obviously be resorted to by those skilled in the art without departing from the described invention, as hereinafter defined by the appended claims, as only a preferred embodiment thereof has been disclosed.

What is claimed is:

1. A bias cutting apparatus for cutting rubberized fabric comprising a support frame, a carriage mounted on said support frame for reciprocal movement, drive means connected to said carriage for reciprocating said carriage, a cutter support member pivotally secured to said carriage, a cutter means journaled on said cutter support member for rotation thereon, power means mounted on said carriage operatively connected to said cutter means for rotating said cutter means, said cutter means having a plurality of spaced linear cutting edges, a guide bar secured to the lower portion of said support frame over which fabric is moved and under which a conveyor belt travels, anvil means mounted on said cutter support member for movement therewith, said anvil means having a linear cutting edge, said cutter means having its cutting edges parallel to said linear cutting edge of said anvil means, and power operated means interconnecting said carriage and said cutter support member for pivoting said cutter support member on said carriage to move said cutter support member and anvil away from said guide bar to facilitate the movement of fabric while said cutter support member and carriage are moved back for a subsequent cutting of the fabric.

2. A bias cutting apparatus as set forth in claim 1 wherein said guide bar extends transversely across said apparatus, and said pivotal mounting of said cutter support member on said carriage includes a rod that is parallel to the direction of said guide bar for pivoting said anvil in an arcuate direction about said rod and away from said guide bar.

3. A bias cutting apparatus as set forth in claim 2 wherein said cutter support member has a recess therein extending parallel to the direction of said guide bar, a slide member mounted on said cutter support member, said cutter means journaled on a shaft that is supported by said cutter support member and said slide member adjusting said slide member in said recess for adjusting the parallel relationship of said cutter means to said anvil.

4. A bias cutting apparatus as set forth in claim 3 wherein said carriage has a pair of racks secured thereto, said cutter support member having a drive shaft journaled therein, a pair of spur gears keyed to said drive shaft and meshing with said [rack, said cutter means mounted on one end of said drive shaft] *racks*, said power operated means on said carriage operatively connected to said spur gears for selectively rotating said spur gears *to pivot said cutter support member relative to said carriage.*

5. An apparatus for the cutting of elastomeric fabric material comprising a support frame, guide means on said support frame, carriage means mounted for movement on said guide means, power operated means operatively connected to said carriage means for reciprocating said carriage means on said guide means, cutter support means mounted on said carriage means for movement therewith, cutter means journaled on said cutter support means for rotation thereon, drive means operatively connected to said cutter means for rotating said cutter means, said cutter means having a plurality of circumferentially spaced linear cutting edges, a guide bar secured to the lower portion of said support frame and extending transversely thereacross operative to guide fabric to be cut thereover, anvil means connected to said cutter support means for movement therewith, said anvil means having a linear cutting edge, said spaced linear cutting edges of said cutter means being sequentially cooperative with said cutting edge on said anvil and being parallel thereto to perform a shearing action, said cutter on said carriage is pivotable away from said guide bar in a vertical planar direction relative to said guide bar.

6. An apparatus as set forth in claim 5 wherein said carriage means has a rod journaled thereon that extends in a horizontal direction contained by a vertical plane that is normal to said transverse direction of said guide bar, said cutter support means being pivotally mounted on said rod, and power operated means interconnecting said carriage means and said cutter support means for selectively pivoting said cutter support means about said rod upon actuation of said power operated means.

7. An apparatus as set forth in claim 6 wherein a drive shaft is mounted in said cutter support means for rotatably supporting said cutter means and adjusting means interconnecting said carriage means and said cutter support means for adjusting the parallel relationship of said cutter means with said anvil.

8. An apparatus as set forth in claim 7 wherein said adjusting means includes a slide block slidably mounted on ways in said cutter support means and set screws operatively connected to said block for positioning said slide block relative to said cutter support means.

9. An apparatus as set forth in claim 8 wherein said drive shaft is supported at one end in said cutter support means and supported at the other end in said slide block to thereby adjust the relationship of said cutter means relative to said anvil.

* * * * *